United States Patent
Lee et al.

(10) Patent No.: US 9,046,358 B2
(45) Date of Patent: Jun. 2, 2015

(54) SENSOR, METHOD OF OPERATING THE SAME, AND SYSTEM INCLUDING THE SAME

(75) Inventors: Tae Yon Lee, Seoul (KR); Young Gu Jin, Osan-si (KR); Dong Ki Min, Seoul (KR); Dong Seok Suh, Hwaseong-si (KR); Jae Pil Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 829 days.

(21) Appl. No.: 12/942,581

(22) Filed: Nov. 9, 2010

(65) Prior Publication Data

US 2011/0188026 A1    Aug. 4, 2011

(30) Foreign Application Priority Data

Feb. 4, 2010   (KR) .................. 10-2010-0010321

(51) Int. Cl.
   *G01C 3/08*   (2006.01)
   *H01J 40/14*   (2006.01)

(52) U.S. Cl.
   CPC .. *G01C 3/08* (2013.01); *H01J 40/14* (2013.01)

(58) Field of Classification Search
   CPC ......... G01C 3/08; H01J 40/14; H04N 5/3597; G01S 7/4863; H01L 27/14887
   USPC ........................................ 356/5.01; 250/216
   See application file for complete search history.

(56) References Cited

U.S. PATENT DOCUMENTS

| | | | | |
|---|---|---|---|---|
| 4,985,775 A | * | 1/1991 | Murayama et al. | 348/314 |
| 6,552,320 B1 | * | 4/2003 | Pan | 250/208.1 |
| 6,906,302 B2 | * | 6/2005 | Drowley | 250/208.1 |
| 2001/0024271 A1 | * | 9/2001 | Takayanagi et al. | 356/5.01 |
| 2009/0236644 A1 | * | 9/2009 | Adkisson et al. | 257/292 |

FOREIGN PATENT DOCUMENTS

JP        2009-47662 A      3/2009

* cited by examiner

*Primary Examiner* — Luke Ratcliffe
*Assistant Examiner* — Vicente Rodriguez
(74) *Attorney, Agent, or Firm* — Sughrue Mion, PLLC

(57) ABSTRACT

A method includes providing packets to demodulate a modulated photon signal output from a light source, wherein each packet includes a first interval and a second interval, and providing oscillation signals respectively having different phases from one another to photogates during the first interval of each of the packets. The light source is disabled and a direct current (DC) voltage is provided to the photogates during the second interval of each of the packets.

20 Claims, 14 Drawing Sheets

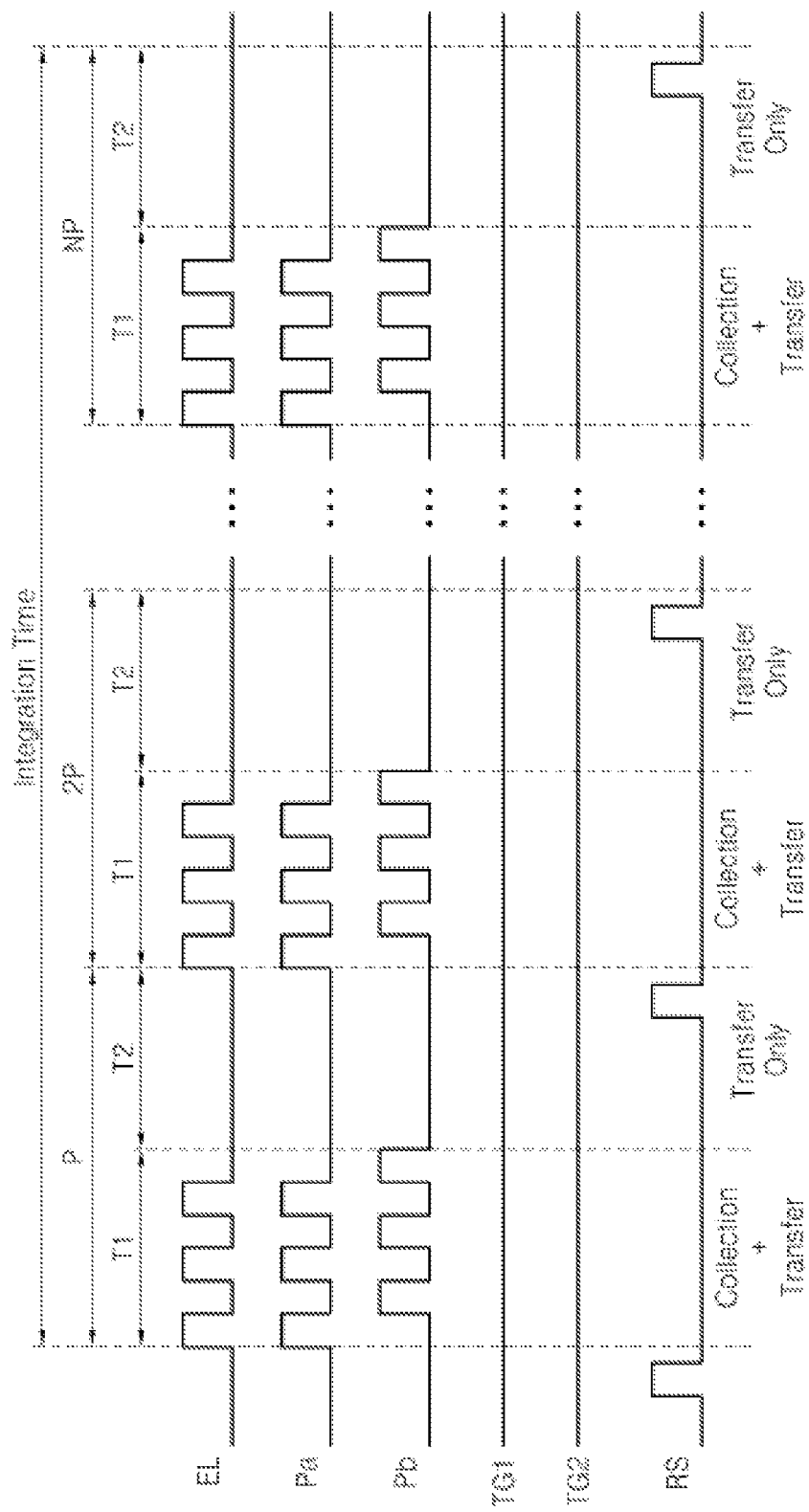

SENSOR, METHOD OF OPERATING THE SAME, AND SYSTEM INCLUDING THE SAME

CROSS-REFERENCE TO RELATED APPLICATIONS

This application claims priority under 35 U.S.C. §119 to Korean Patent Application No. 10-2010-0010321, filed on Feb. 4, 2010, in the Korean Intellectual Property Office (KIPO), the entire contents of which are incorporated herein by reference.

BACKGROUND

The present exemplary embodiments relate to a sensor, and more particularly, to a sensor for increasing a demodulation efficiency using the time-of-fight (TOF) principle, a method of operating the sensor, and a data processing system including the same.

Sensors are devices that detect the state or the position of an object and convert the detection result into an electrical signal. There are different types of sensors such as light sensors, temperature sensors, pressure sensors, magnetic sensors, and depth sensors. Of those sensors, a depth sensor may measure the time it takes for an optical pulse signal emitted by a source to return to the sensor after being reflected by a target (or an object of measurement), and may calculate the distance between the sensor and the target based on the measurement result. Mainly microwaves, light waves, or ultrasonic waves are used for the signal output from the source. The depth sensor may measure a distance using the TOF measurement method.

SUMMARY

Some exemplary embodiments provide a sensor for accurately measuring a distance by compensating for the loss of photoelectrons occurring due to thermal diffusion during demodulation, a method of operating the sensor, and a data processing system including the same.

An aspect of an exemplary embodiment provides a method of operating a sensor, including providing a plurality of packets, each packet including a first interval and a second interval, to demodulate a modulated photon signal output from a light source; providing a plurality of oscillation signals respectively having phases which are different from one another to a plurality of photogates, respectively, during the first interval of each of the plurality of packets; and disabling the light source and providing a direct current (DC) voltage to the plurality of photogates during the second interval of each of the plurality of packets.

A phase difference between the plurality of oscillation signals may be 180 degrees and a phase difference between the modulated photon signal and at least one of the plurality of oscillation signal may be 0, 90, 180, or 270 degrees. The DC voltage may be a ground voltage.

Alternatively, when each of the plurality of oscillation signals oscillates between a first level and a second level, the DC voltage may be higher than or equal to the first level and lower than the second level. A first depletion layer may be formed in a semiconductor substrate under each of the photogates when the plurality of oscillation signals are provided respectively to the plurality of photogates at the first level; a second depletion layer may be formed in the semiconductor substrate under each of the plurality of photogates when the plurality of oscillation signals are provided respectively to the plurality of photogates at the second level; and the second depletion layer may be larger than the first depletion layer.

The method may further include applying a turn-on voltage to a plurality of transfer gates, which transfer photocharges generated under the plurality of photogates respectively to a plurality of floating diffusion node, during the first interval and the second interval.

An aspect of another exemplary embodiment provides a method of operating a sensor including outputting a modulated photon signal from a light source; providing a plurality of packets, each packet including a first interval and a second interval; providing an oscillation signal to a photogate to demodulate the modulated photon signal during the first interval of each of the plurality of packets; generating photocharges under a photogate; transferring the photocharges generated under the photogate to a floating diffusion node using the oscillation signal; and disabling the light source and transferring residual photocharges among the generated photocharges to the floating diffusion node by applying a DC voltage to the photogate during the second interval of each of the plurality of packets.

The DC voltage may be a ground voltage. Alternatively, when the oscillation signal oscillates between a first level and a second level, the DC voltage may be higher than or equal to the first level and lower than the second level. A first depletion layer may be formed in a semiconductor substrate under the photogate when the oscillation signal is provided to the photogate at the first level; a second depletion layer may be formed in the semiconductor substrate under the photogate when the oscillation signal at the second level; and the second depletion layer may be larger than the first depletion layer.

An aspect of another exemplary embodiment provides a sensor including a light source configured to generate a modulated photon signal, a plurality of sensing circuits including a plurality of photogates, and a controller configured to control the light source and the plurality of sensing circuits.

The controller may enable the light source and provide a plurality of oscillation signals respectively having phases which are different from one another to the plurality of photogates respectively during a first interval of each of a plurality of packets, each of the packets including the first interval and a second interval to demodulate the modulated photon signal output from the light source. The controller may disable the light source and provide a DC voltage to the plurality of sensing circuits during the second interval of each of the plurality of packets.

The controller may generate the plurality of oscillation signals having a 180-degree phase difference from each other. When each of the plurality of oscillation signals oscillates between a first level and a second level, the DC voltage may be higher than or equal to the first level and lower than the second level.

A first depletion layer may be formed in a semiconductor substrate under each of the photogates respectively when the oscillation signals are respectively provided to the photogates at the first level; a second depletion layer may be formed in the semiconductor substrate under each of the photogates respectively when the plurality of oscillation signals are respectively provided to the photogates at the second level; and the second depletion layer may be larger than the first depletion layer.

Each of the plurality of sensing circuits may include a floating diffusion region formed in a semiconductor substrate and a transfer gate configured to transfer photocharges generated in the semiconductor substrate under the photogate to the floating diffusion region. The controller may apply a voltage for turning on the transfer gate to the transfer gate during the first interval and the second interval.

An aspect of another exemplary embodiment provides a data processing system including the above-described sensor and a processor configured to control the controller included in the sensor. The controller may generate the plurality of oscillation signals having a 180-degree phase difference from each other.

The controller may generate the plurality of oscillation signals which oscillate between a first level and a second level. The DC voltage may be higher than or equal to the first level and lower than the second level. A first depletion layer may be formed in a semiconductor substrate under each of the photogates respectively when the oscillation signals are respectively provided to the photogates at the first level; a second depletion layer may be formed in the semiconductor substrate under each of the photogates respectively when the plurality of oscillation signals are respectively provided to the photogates at the second level; and the second depletion layer may be larger than the first depletion layer.

The data processing system may be a three-dimensional distance measurer, a game controller, a depth camera, or a gesture sensing apparatus.

BRIEF DESCRIPTION OF THE DRAWINGS

The above and other features and advantages will become more apparent by describing in detail exemplary embodiments with reference to the attached drawings. The accompanying drawings are intended to depict exemplary embodiments and should not be interpreted to limit the intended scope of the claims. The accompanying drawings are not to be considered as drawn to scale unless explicitly noted.

FIG. 2C is a timing chart of waveforms of control signals for the depth pixel illustrated in FIG. 1;

DETAILED DESCRIPTION OF EXAMPLE EMBODIMENTS

Figure 1:
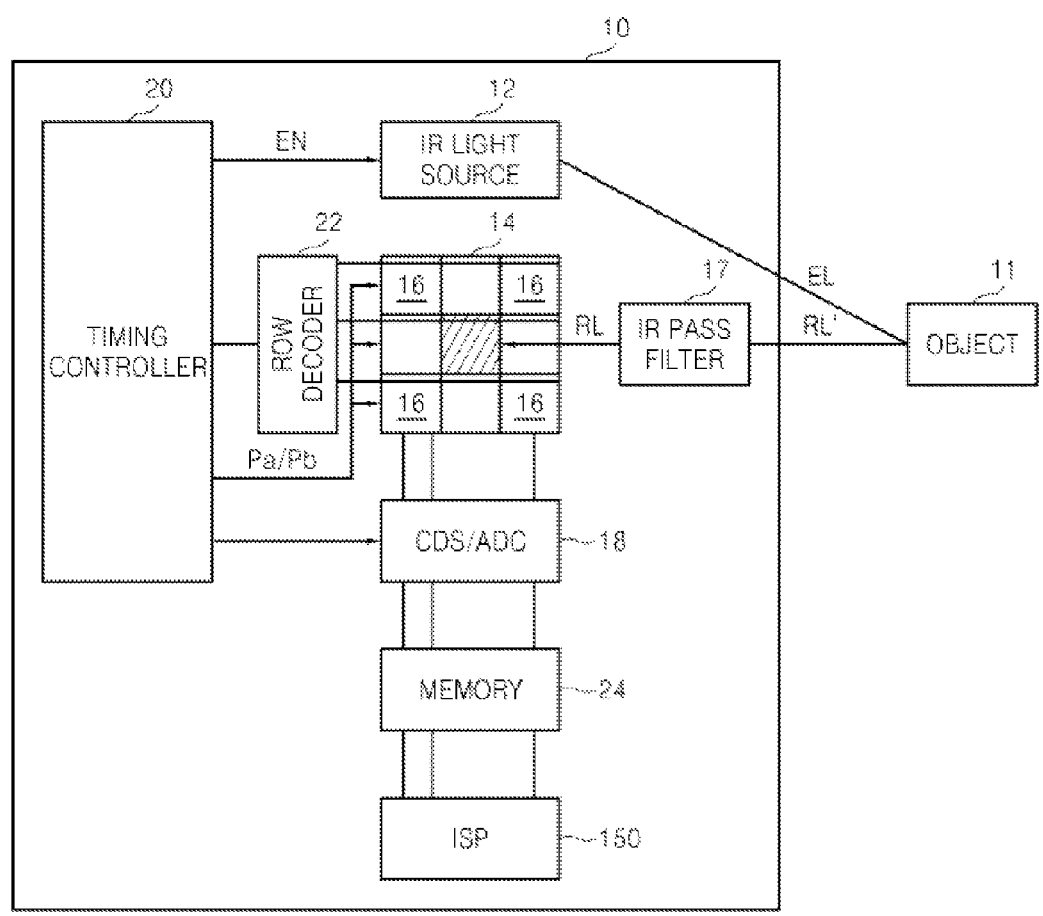
FIG. 1 is a block diagram of a sensor including an array of depth pixels 16 each including two photogates according to an exemplary embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the exemplary embodiments set forth herein.

Accordingly, while exemplary embodiments are capable of various modifications and alternative forms, exemplary embodiments thereof are shown by way of example in the drawings and will herein be described in detail. It should be understood, however, that there is no intent to limit exemplary embodiments to the particular forms disclosed, but to the contrary, exemplary embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular exemplary embodiments only and is not intended to be limiting of exemplary embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram of a sensor 10 including a plurality of depth pixels 16 (or a Z-pixel), each including two photogates according to an exemplary embodiment. The sensor 10 may emit a modulated infrared photon (or optical) signal EL using an infrared light source 12 and measure a distance using a time difference $t_A$ between emission of the modulated infrared photon signal EL from the infrared light source 12 and reception of a reflected photon signal RL' (or RL) corresponding to the modulated infrared photon signal EL that has been reflected from an object (or a target) 11. The time difference $t_A$ is given by Equation (1):

$$t_A = \frac{2d}{c}, \quad (1)$$

where "d" is the distance between the sensor 10 and the object 11 and "c" is the velocity of light.

The sensor 10 includes the infrared light source (or infrared emitter) 12, a sensor array 14, an infrared pass filter 17, a correlated double sampling (CDS)/analog-to-digital conversion (ADC) circuit 18, a timing controller 20, a row decoder 22, and a memory 24. The sensor 10 and an image signal processor (ISP) 150 may be implemented in a single semiconductor chip (e.g., a system-on-chip (SoC)) or alternatively may be implemented in different semiconductor chips, respectively. The sensor 10 may also include a column decoder (not shown) controlled by the timing controller 20 to transmit data output from the memory 24 to the ISP 150. In addition, the sensor 10 may include a lens (not shown) converging a reflected photon signal to the infrared pass filter 17. The operations of a lens module (not shown) including the infrared pass filter 17 and the lens may be controlled by the timing controller 20.

The sensor array 14 may include a plurality of depth pixels 16. The timing controller 20 may be a controller that controls the operation of the infrared light source 12 and the operation of each depth pixel 16. The infrared light source 12 is controlled by the timing controller 20 to emit the modulated infrared photon signal EL. In detail, the timing controller 20 generates two oscillation signals Pa and Pb to control the operations of a plurality of photogates included in each depth pixel 16. The two oscillation signals Pa and Pb have a 180-degree phase difference therebetween, as shown in FIG. 2C.

The timing controller 20 may generate a plurality of packets P, 2P, . . . , NP, as shown in FIG. 2C. Each of the packets P through NP includes a first interval (T1 in FIG. 2C, e.g., an on-time interval) and a second interval (T2 in FIG. 2C, e.g., an off-time interval). The timing controller 20 outputs the two oscillation signals Pa and Pb oscillating between a first level and a second level during the first interval and outputs a direct current (DC) voltage during the second interval.

For instance, as shown in FIG. 2C, during the first interval T1, the timing controller 20 outputs a control signal EN for enabling the infrared light source 12, i.e., for maintaining the light source 12 in an on-state, and provides the two oscillation signals Pa and Pb having a phase difference, for example, of 180 degrees, therebetween to photogates included in each depth pixel 16 to demodulate the modulated infrared photon signal EL output from the infrared light source 12. Accordingly, during the first interval T1, the infrared light source 12 outputs the modulated infrared photon signal EL in response to the control signal EN. During the second interval T2, the timing controller 20 outputs the control signal EN for disabling the infrared light source 12, i.e., for maintaining the light source 12 in an off-state, and provides a DC voltage to the photogates included in each depth pixel 16.

The infrared light source 12 may be implemented by a light emitting diode (LED), a laser diode (LD), or an organic LED (OLED), for example. The sensor 10 may include a plurality of infrared light sources around the sensor array 14, but for clarity of the description, only one infrared light source 12 is illustrated.

Figure 2A:
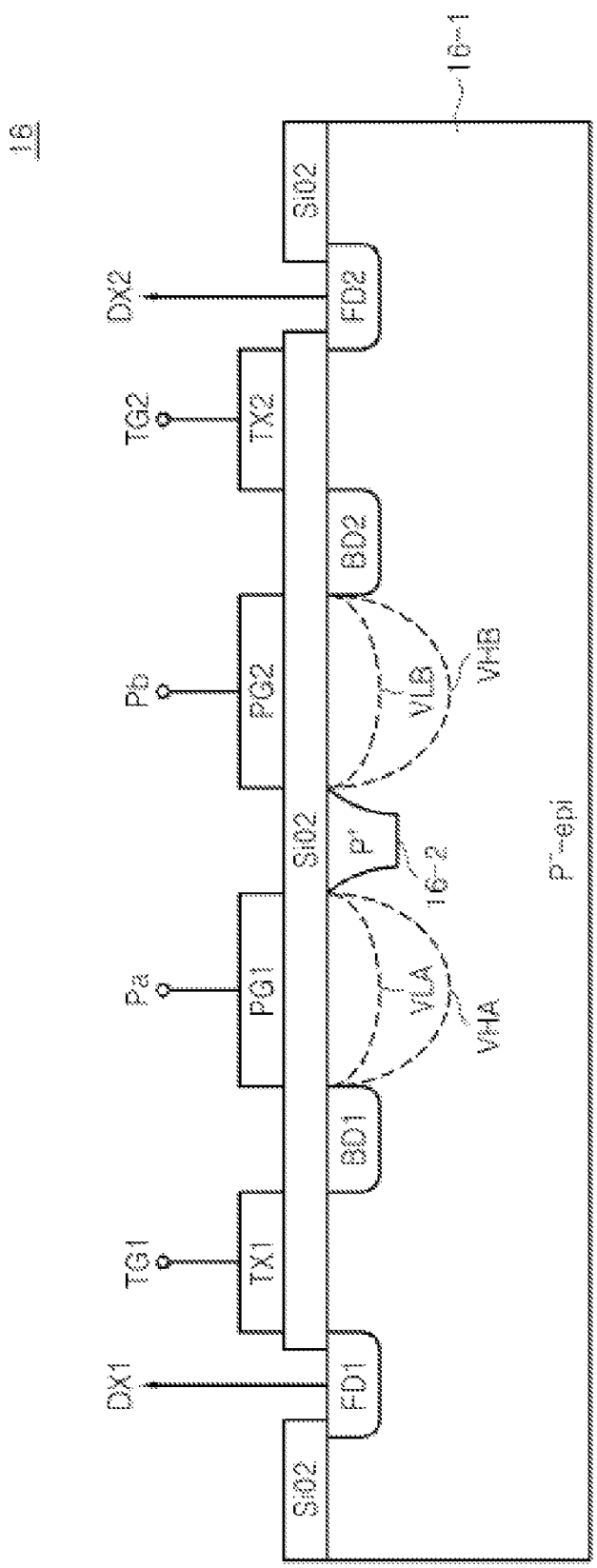
FIG. 2A is a cross-sectional view of the depth pixel illustrated in FIG. 1.
Figure 2B:
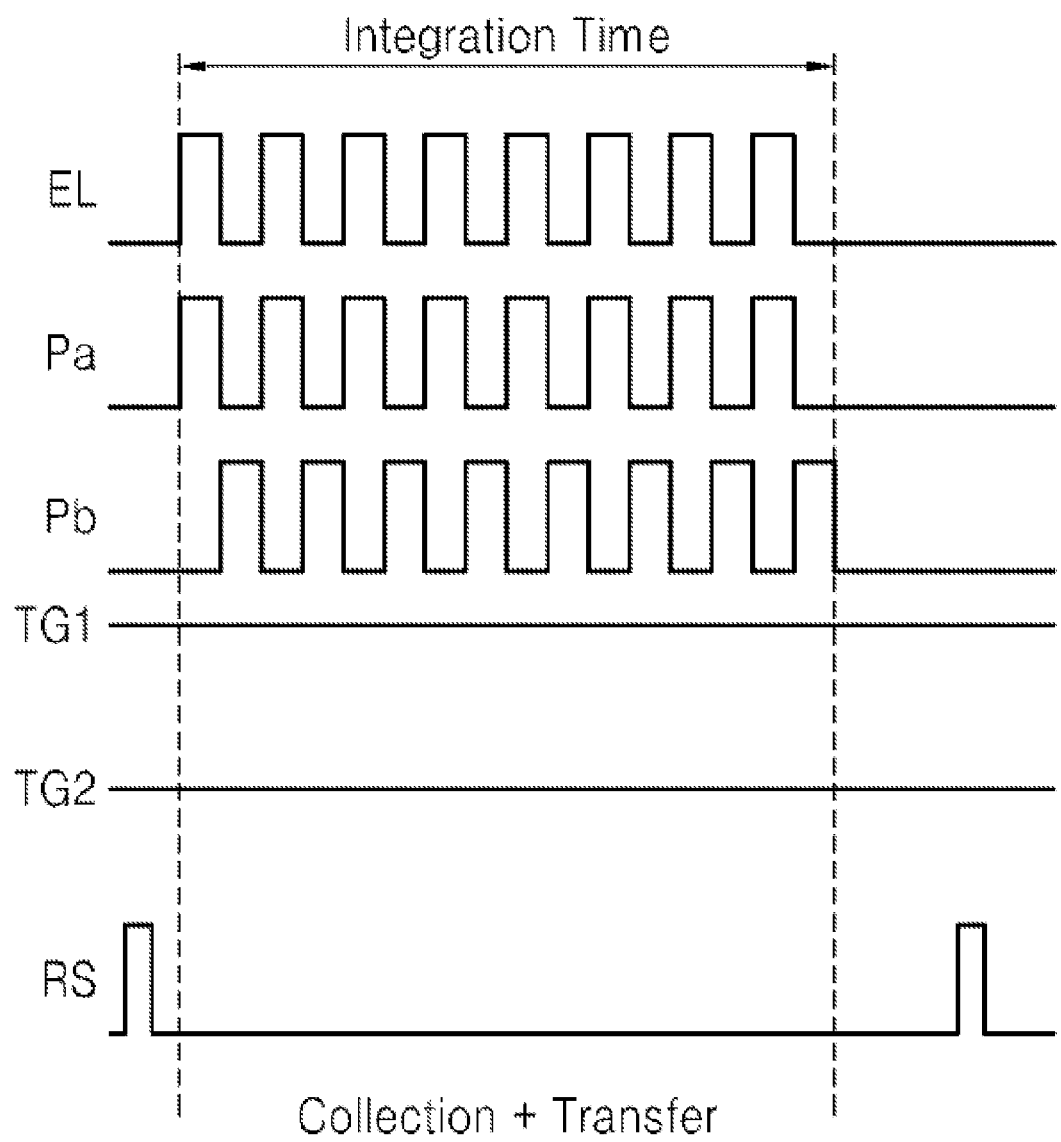
FIG. 2B is a timing chart of waveforms of control signals for a conventional depth pixel.

FIG. 2A is a cross-sectional view of each depth pixel 16 illustrated in FIG. 1. FIG. 2B is a timing chart of waveforms of control signals for a conventional depth pixel. FIG. 2C is a timing chart of waveforms of control signals for the depth pixel 16 illustrated in FIG. 1.

Referring to FIG. 2A, the depth pixel 16 includes a first photogate PG1, a second photogate PG2, a first transmission circuit TX1, a second transmission circuit TX2, a first bridging region BD1, a second bridging region BD2, a first floating diffusion region FD1, and a second floating diffusion region FD2. Alternatively, the first bridging region BD1 and the second bridging region BD2 may not be included. The bridging regions BD1 and BD2 and the floating diffusion regions FD1 and FD2 may be formed in a semiconductor substrate 16-1 (e.g., a P⁻-type epitaxial region).

the semiconductor substrate 16-1 under the first and second photogates PG1 and PG2, photoelectrons (or photocharges) are generated by the reflected photon signal RL that has passed through either of the first and second photogates PG1 and PG2.

Referring to FIGS. 2A and 2B, the first and second photogates PG1 and PG2 collect and transfer in response to the two oscillation signals Pa and Pb, respectively, which are output from the timing control 20 and have a 180-degree phase difference therebetween. The collection is a process of collecting photocharges generated by the reflected photon signal RL on the surface of the semiconductor substrate 16-1 and the transfer is a process of transferring the collected photocharges to the floating diffusion regions FD1 and FD2 using the transmission circuits TX1 and TX2, respectively.

For instance, when the oscillation signals Pa and Pb are at a first level, e.g., a low level, that is, when a potential applied to photoelectrons generated in the semiconductor substrate 16-1 is low, photoelectrons collected under the photogates PG1 and PG2 are transferred to the floating diffusion regions FD1 and FD2, respectively, through the bridging regions BD1 and BD2, respectively. In FIG. 2A, reference characters VLA and VLB denote regions or depletion layers in which photoelectrons are collected when the oscillation signals Pa and Pb at the first level are respectively applied to the photogates PG1 and PG2, i.e., a first depletion layer.

When the oscillation signals Pa and Pb are at a second level, e.g., a high level, that is, when a potential applied to photoelectrons generated in the semiconductor substrate 16-1 is high, photoelectrons generated by the reflected photon signal RL are collected under the photogates PG1 and PG2. In FIG. 2A, reference characters VHA and VHB denote regions or depletion layers in which photoelectrons are collected when the oscillation signals Pa and Pb at the second level are respectively applied to the photogates PG1 and PG2, i.e., a second depletion layer. The second depletion layers VHA and VHB formed in the semiconductor substrate 16-1 under the photogates PG1 and PG2 when the oscillation signals Pa and Pb at the second level are respectively applied to the photogates PG1 and PG2 are larger than the first depletion layers VLA and VLB formed in the semiconductor substrate 16-1 when the oscillation signals Pa and Pb at the first level are respectively applied to the photogates PG1 and PG2.

In the semiconductor substrate 16-1, an isolation region 16-2 may be formed to prevent the photoelectrons generated under the photogates PG1 and PG2 from influencing each other. For example, the semiconductor substrate 16-1 may be a P⁻-doped epitaxial region and the isolation region 16-2 may be a P⁺-doped region.

When the collection and the transfer are not distinctly separated due to the low photoelectron transfer efficiency of a sensor, photoelectrons generated during the collection may be mixed with photoelectrons involved with the transfer in the floating diffusion regions FD1 and FD2. In this case, when a signal output from each of the floating diffusion regions FD1 and FD2 is demodulated, demodulation efficiency is decreased.

Accordingly, to increase the photoelectron transfer efficiency, the sensor 10 uses a plurality of packets P through NP including the first interval T1 and the second interval T2. In other words, the sensor 10 uses the second interval T2 included in each of the packets P through NP as a period for the transfer of photoelectrons. As shown in FIG. 2C, integration time include the packets P through NP, each of which includes the first interval (or on-time interval) T1 and the second interval (or off-time interval) T2. Collection and transfer are both performed during the first interval T1, but only transfer (and not collection) is performed during the second interval T2. At this time, the integration time illustrated in FIG. 2B is the same as that illustrated in FIG. 2C.

The photogates PG1 and PG2 transfer residual photoelectrons, which have not been transferred after being collected during the first interval T1, to the floating diffusion regions FD1 and FD2, respectively, during the second interval T2, thereby increasing photoelectron transfer efficiency. In other words, the sensor 10 increases the photoelectron transfer efficiency by separately defining the second interval T2 for the transfer of residual photoelectrons.

Figure 3:
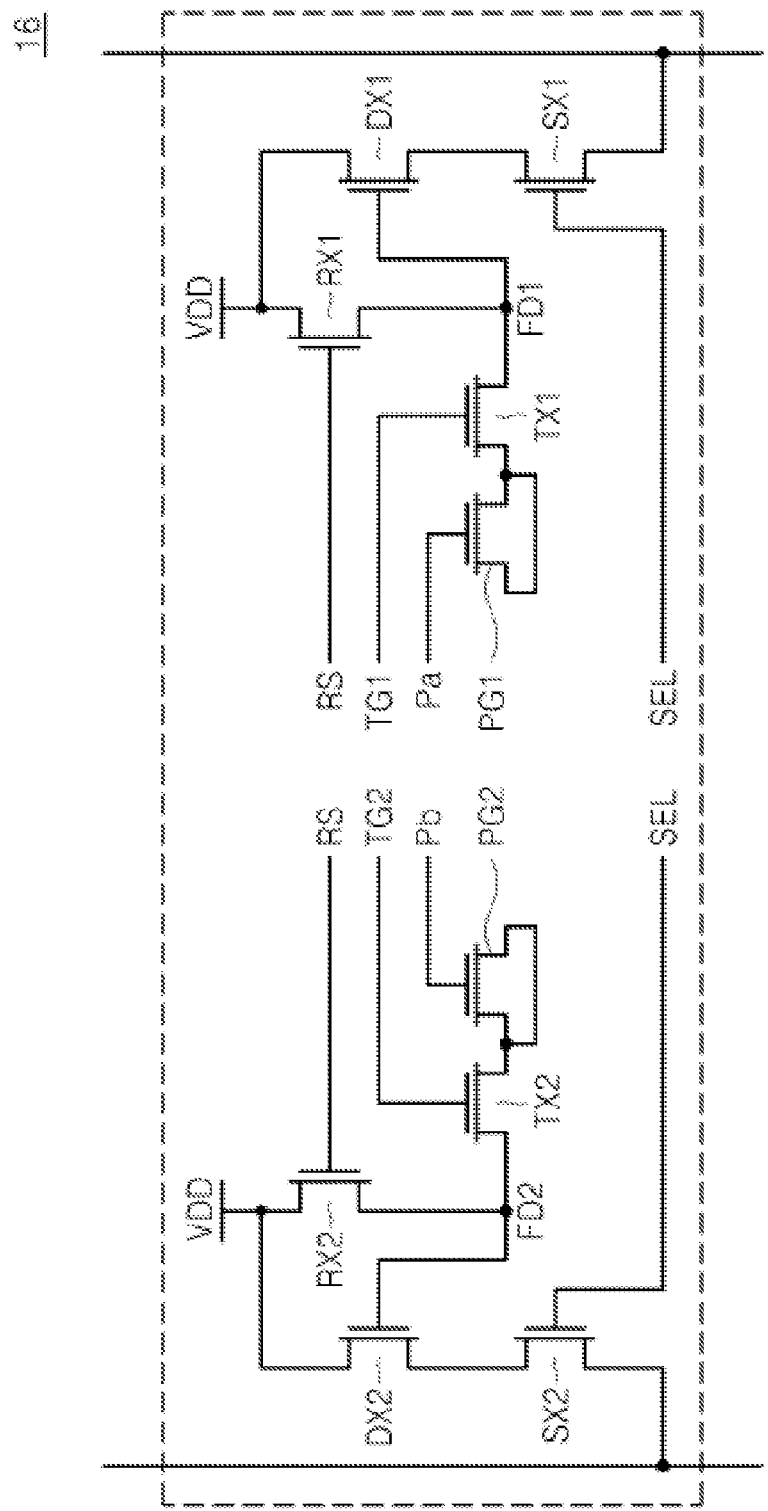
FIG. 3 is a diagram of a circuit including a plurality of transistors and a plurality of photogates implemented in the depth pixel illustrated in FIG. 2A.

FIG. 3 is a circuit diagram including a plurality of transistors and a plurality of photogates implemented in the depth pixel 16 illustrated in FIG. 2A. Referring to FIG. 2A and FIG. 3, the first transmission circuit TX1, which may be implemented by a metal-oxide semiconductor field-effect transistor (MOSFET), transfers photoelectrons generated in the semiconductor substrate 16-1 to the first floating diffusion region FD1 in response to a control signal TG1 and adjusts the voltage level of the control signal TG1 applied with proper timing to prevent back diffusion of the photoelectrons from the first floating diffusion region FD1 to the first photogate PG1. The second transmission circuit TX2, which may be implemented by a MOSFET, transfers photoelectrons to the second floating diffusion region FD2 in response to a control signal TG2 and adjusts the voltage level of the control signal TG2 applied with proper timing to prevent back diffusion of the photoelectrons from the second floating diffusion region FD2 to the second photogate PG2. A DC voltage applied to the photogates PG1 and PG2 during the second interval T2 of each of the packets P through NP may be a ground voltage or a voltage higher than or equal to a first level (e.g., 0 V) and lower than a second level (e.g., 3.3 V).

During the first interval T1, the photogates PG1 and PG2 may repeatedly perform collection of photoelectrons generated by the reflected photon signal RL in the semiconductor substrate 16-1 and transfer of the collected photoelectrons to the floating diffusion regions F1 and FD2, respectively, in response to the oscillation signals Pa and Pb, respectively, output from the timing controller 20. The phase difference between the oscillation signals Pa and Pb respectively applied to the photogates PG1 and PG2 is 180 degrees. In addition, the phase difference between the modulated infrared photon signal EL and either or both of the oscillation signals Pa and Pb may be 0, 90, 180, or 270 degrees.

During the first interval T1 of the packets P through NP, photoelectrons generated in the semiconductor substrate 16-1 are transferred to the floating diffusion regions FD1 and FD2 while the oscillation signals Pa and Pb at the first level are applied to the photogates PG1 and PG2, respectively; and photoelectrons generated in the semiconductor substrate 16-1 are collected while the oscillation signals Pa and Pb at the second level are applied to the photogates PG1 and PG2, respectively.

During the second interval T2 of the packets P through NP, the infrared light source 12 is disabled in response to the control signal EN output from the timing controller 20. At this time, the DC voltage is applied to the photogates PG1 and PG2, so that residual photoelectrons, which have not been transferred to the floating diffusion regions FD1 and FD2 among the photoelectrons generated during the first interval T1, are transferred to the floating diffusion regions FD1 and FD2 by the transmission circuits TX1 and TX2, respectively. As shown in FIG. 2C, the transmission circuits TX1 and TX2 are maintained at an on-state in response to the respective control signals TG1 and TG2 at a high level.

Referring to FIG. 3, the depth pixel 16 having the two photogates PG1 and PG2 includes a first sensing circuit (or a pixel A) and a second sensing circuit (or a pixel B). The first sensing circuit (or the pixel A) includes the first photogate PG1 and a plurality of transistors TX1, RX1, DX1, and SX1, which process, for example, collect or transfer, photoelectrons generated by the reflected photon signal RL that has passed through the first photogate PG1. The second sensing circuit (or the pixel B) includes the second photogate PG2 and a plurality of transistors TX2, RX2, DX2, and SX2, which process, for example, collect or transfer, photoelectrons generated by the reflected photon signal RL that has passed through the second photogate PG2.

The reset transistors RX1 and RX2 may reset the floating diffusion regions FD1 and FD2, respectively, in response to a reset signal RS output from the timing controller 20. The transmission circuit such as a transfer transistor TX1 may transfer photoelectrons generated in the semiconductor substrate 16-1 under the first photogate PG1 to the first floating diffusion region FD1 in response to the control signal TG1. The transmission circuit such as the transfer transistor TX2 may transfer photoelectrons generated in the semiconductor substrate 16-1 under the second photogate PG2 to the second floating diffusion region FD2 in response to the control signal TG2. The drive transistors DX1 and DX2 functioning as source follower buffer amplifiers may buffer a supply voltage VDD in response to photoelectrons at the first floating diffusion region FD1 and photoelectrons at the second floating diffusion region FD2, respectively. The selection transistor SX1 may output a signal buffered by the drive transistor DX1 to a column line in response to a control signal SEL output from the timing controller 20 and the selection transistor SX2 may output a signal buffered by the drive transistor DX2 to a column line in response to the control signal SEL.

Referring back to FIG. 1, the CDS/ADC circuit 18 may perform CDS and ADC on a signal output from each pixel 16 and output a digital signal in compliance with the timing controller 20. The memory 24 may receive the digital signal output from the CDS/ADC circuit 18 and store the digital signal. The digital signal stored in the memory 24 may be output to the ISP 150 by a column decoder (not shown).

Figure 4A:
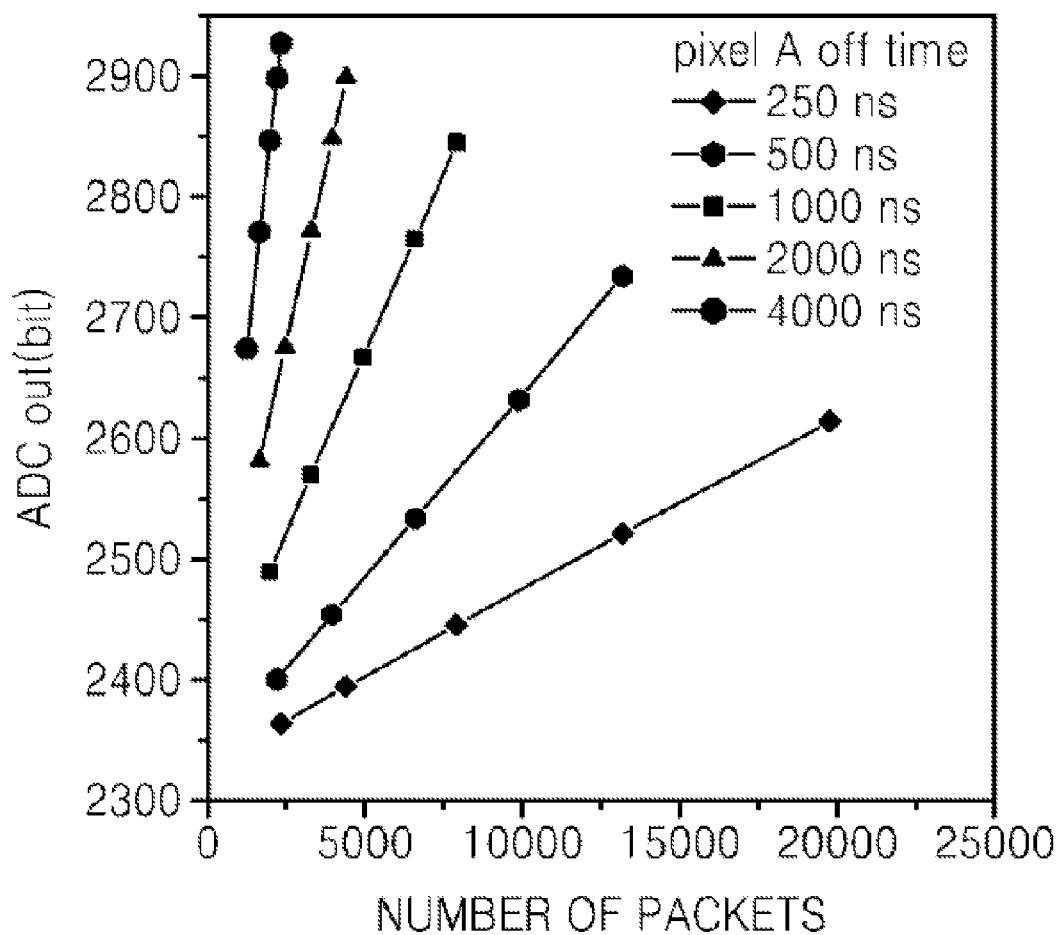
FIG. 4A is a graph illustrating the relationship between the number of packets and the result of analog-to-digital conversion of an output signal of a first floating diffusion region during integration time with respect to a second interval according to an exemplary embodiment.

FIG. 4A is a graph illustrating the relationship between the number of packets and the result of ADC of an output signal of a first floating diffusion region during the integration time with respect to the second interval. The X-axis is the number of packets and the Y-axis is the number of bits in a digital signal "ADC out" output from pixel A. "Pixel A off time" indicates the time length of the second interval T2 of the pixel A.

Figure 4B:
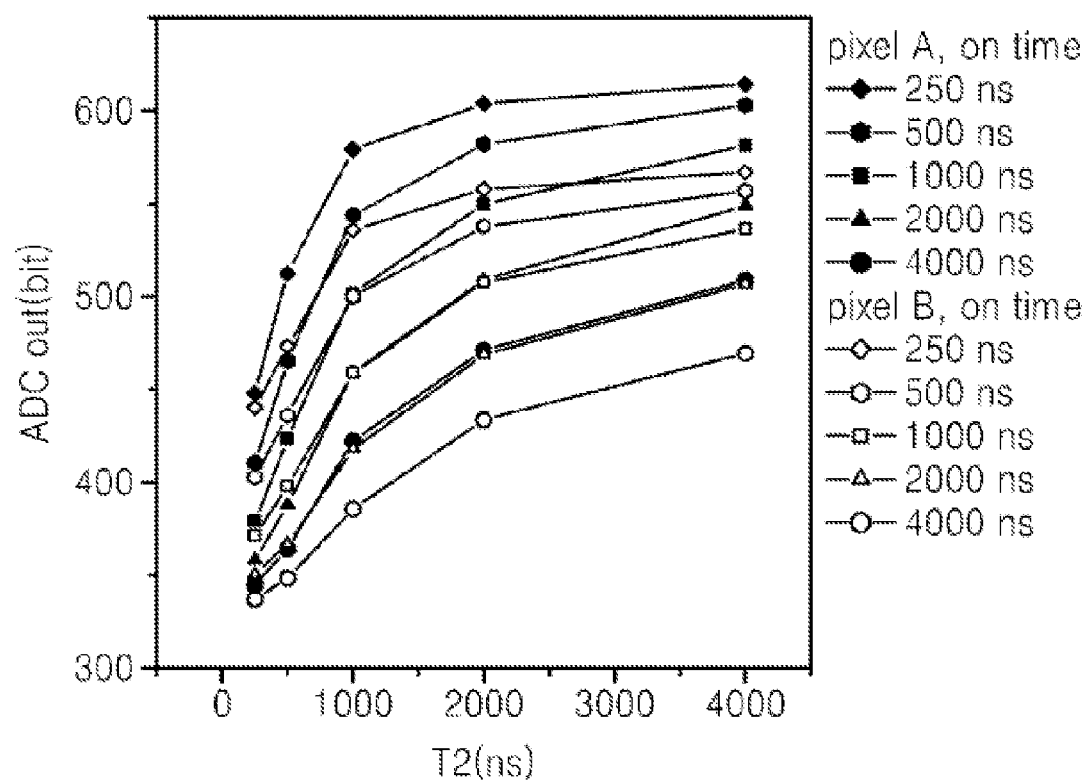
FIG. 4B is a graph illustrating the relationship among results of analog-to-digital conversion of output signals of first floating diffusion regions with respect to a first interval according to an exemplary embodiment.

FIG. 4B is a graph illustrating the relationship among results of ADC of output signals of first floating diffusion regions with respect to the first interval T1. The X-axis is the time length of the second interval T2 and the Y-axis is the number of bits of a digital signal "ADC out" output from pixel A or pixel B. "Pixel A, on time" indicates the time length of the first interval T1 of the pixel A and "pixel B, on time" indicates the time length of the first interval T1 of the pixel B.

Referring to FIGS. 2C, 4A, and 4B, when a demodulation frequency is 16 MHz and the integration time shown in FIG. 2C is 10 msec, as the number of packets during the integration time increases and as the second interval T2 of each packet increases, the number of bits in the digital signal "ADC out" output from the pixel A or B also increases. In other words, when the second interval T2 is increases, electron transfer efficiency also increases, and therefore, demodulation efficiency also increases.

When the modulated infrared photon signal EL and the first oscillation signal Pa have a phase difference of 0 degrees, the first oscillation signal Pa and the second oscillation signal Pb have a phase difference of 180 degrees, and output signals respectively output from the first and second floating diffusion regions FD1 and FD2 are represented with sigA and sigB, respectively, a demodulation contrast D.C. is given by Equation (2):

$$D.C. = \frac{sigA - sigB}{sigA + sigB}. \quad (2)$$

The demodulation contrast D.C. is an indicator of the accuracy of a distance measured in a sensor using time-of-fight (TOF). The greater the demodulation contrast D.C., the higher the accuracy. In other words, as the difference between the signals sigA and sigB increases, the accuracy of a measured distance also increases.

Figure 5A:
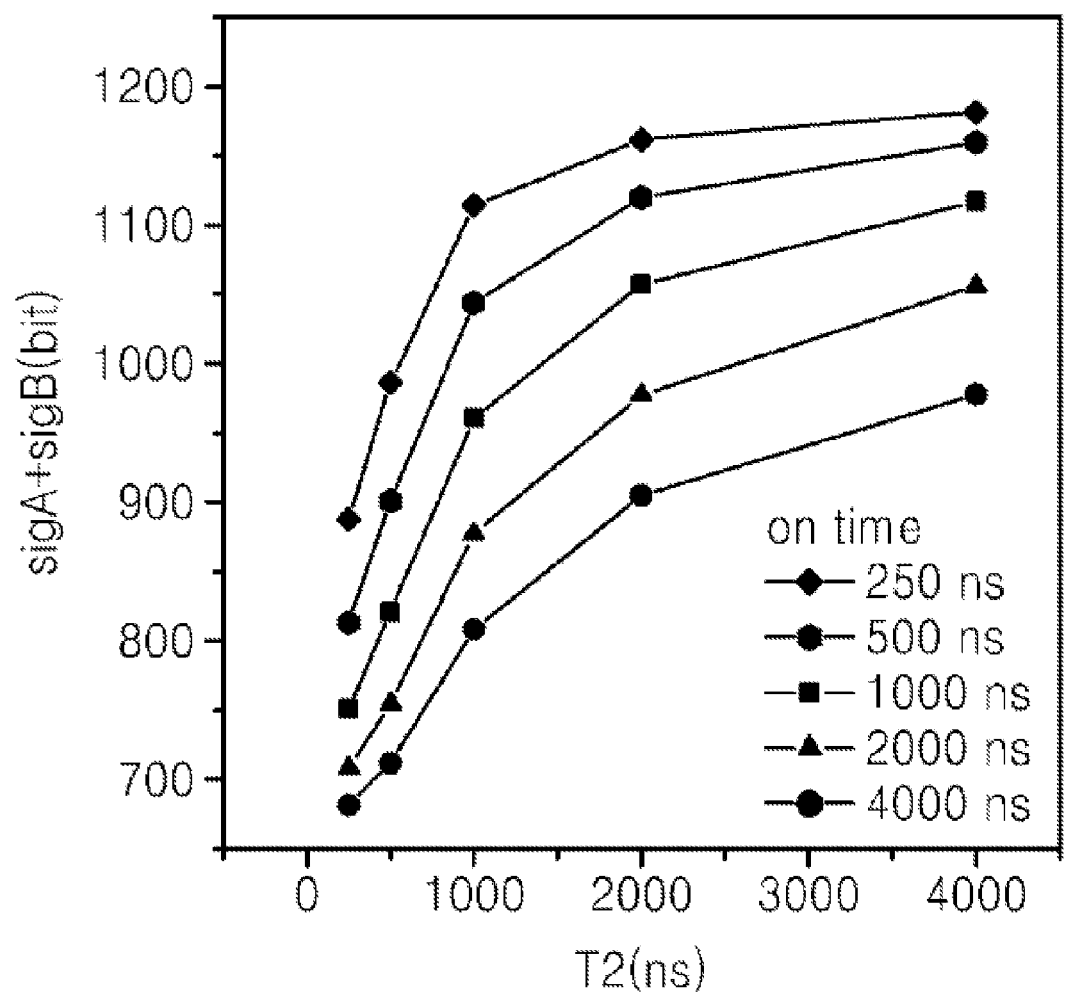
FIG. 5A is a graph of the second interval versus the sum of output signals of the depth pixel illustrated in FIG. 2A according to an exemplary embodiment.
Figure 5B:
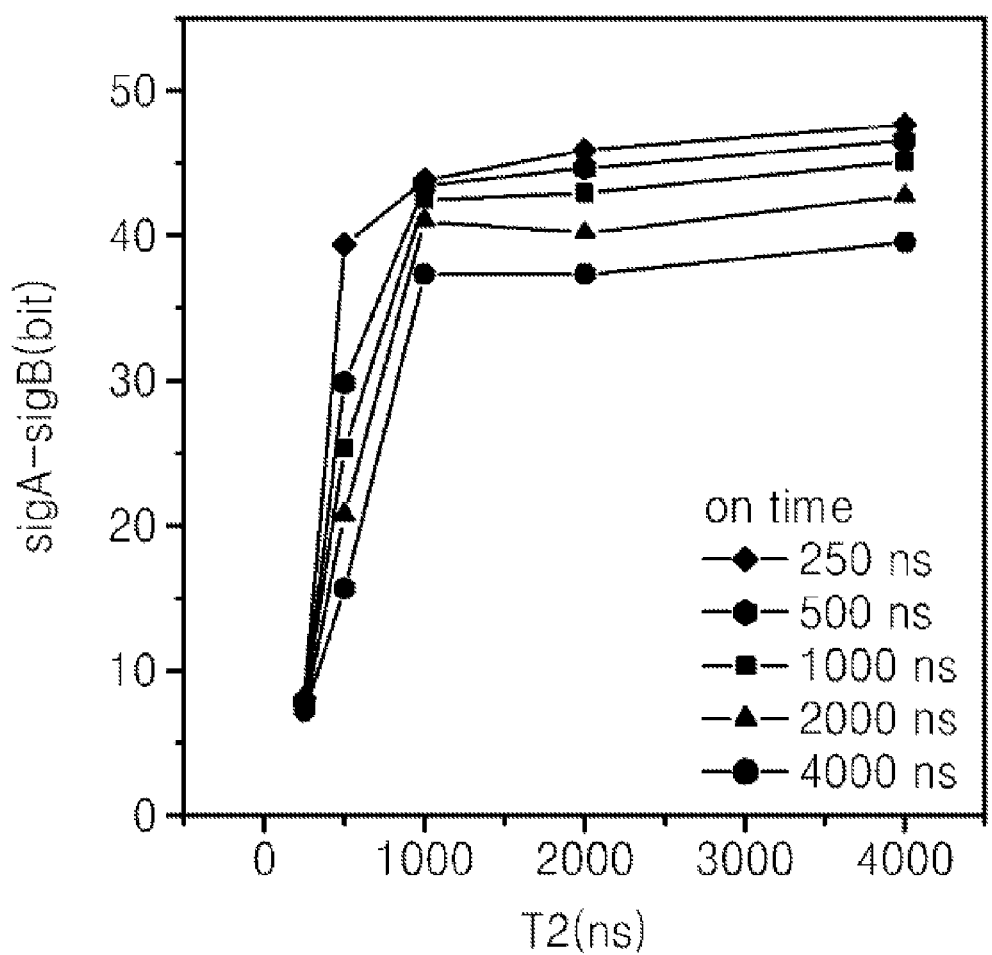
FIG. 5B is a graph of the second interval versus the difference between output signals of the depth pixel illustrated in FIG. 2A according to an exemplary embodiment.
Figure 5C:
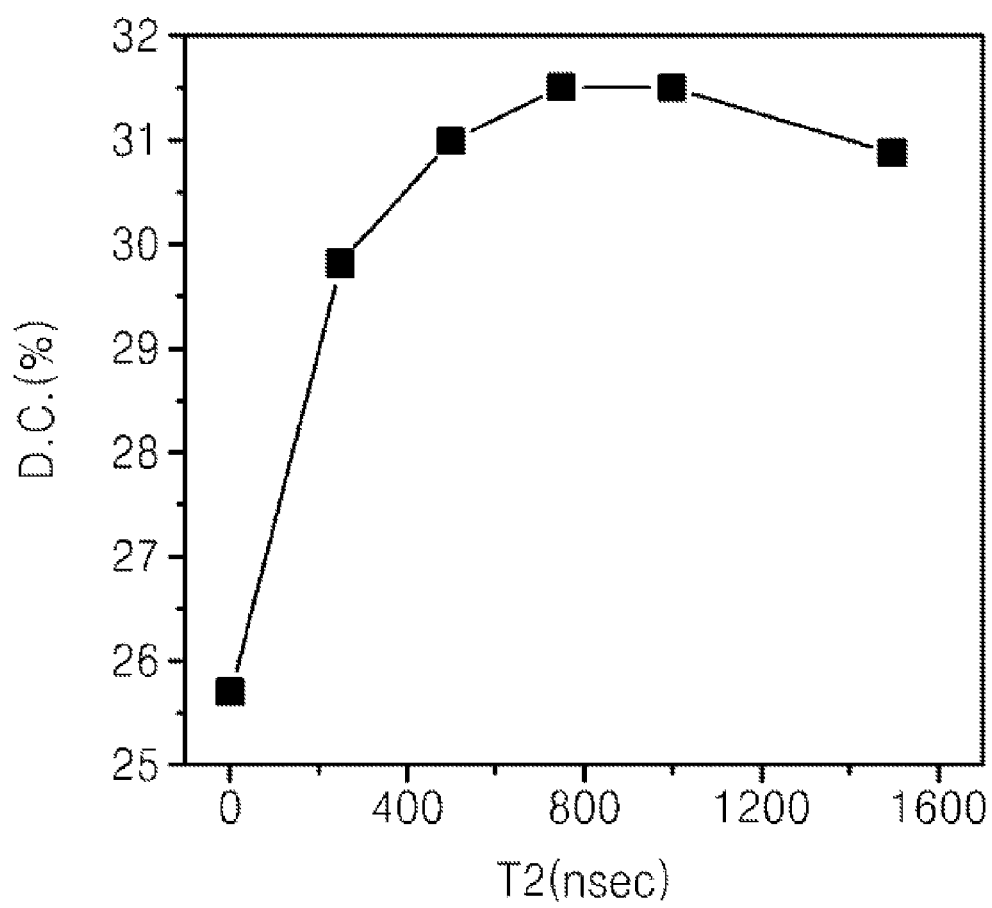
FIG. 5C is a graph of a demodulation contrast of the depth pixel illustrated in FIG. 2A versus the second interval according to an exemplary embodiment.

FIG. 5A is a graph of the second interval versus the sum of output signals of the depth pixel illustrated in FIG. 2A according to an exemplary embodiment. FIG. 5B is a graph of the second interval versus the difference between output signals of the depth pixel illustrated in FIG. 2A according to an exemplary embodiment. FIG. 5C is a graph of demodulation contrast of the depth pixel illustrated in FIG. 2A versus second interval T2 according to an exemplary embodiment.

Referring to FIG. 5A, as the second interval T2 illustrated in FIG. 2C increases, the sum of output signals, i.e., sigA+sigB also increases. Referring to FIG. 5B, as the second interval T2 illustrated in FIG. 2C increases, the difference between output signals, i.e., sigA−sigB also increases. Referring to FIG. 5C, the demodulation contrast D.C. given by Equation (2) increases as the second interval T2 increases.

According to an exemplary embodiment, the sensor 10 separately defines the second interval T2 to transfer residual photoelectrons that have not been transferred during the first interval T1, thereby increasing the photoelectron transfer efficiency. As a result, the demodulation efficiency is increased.

Figure 6:
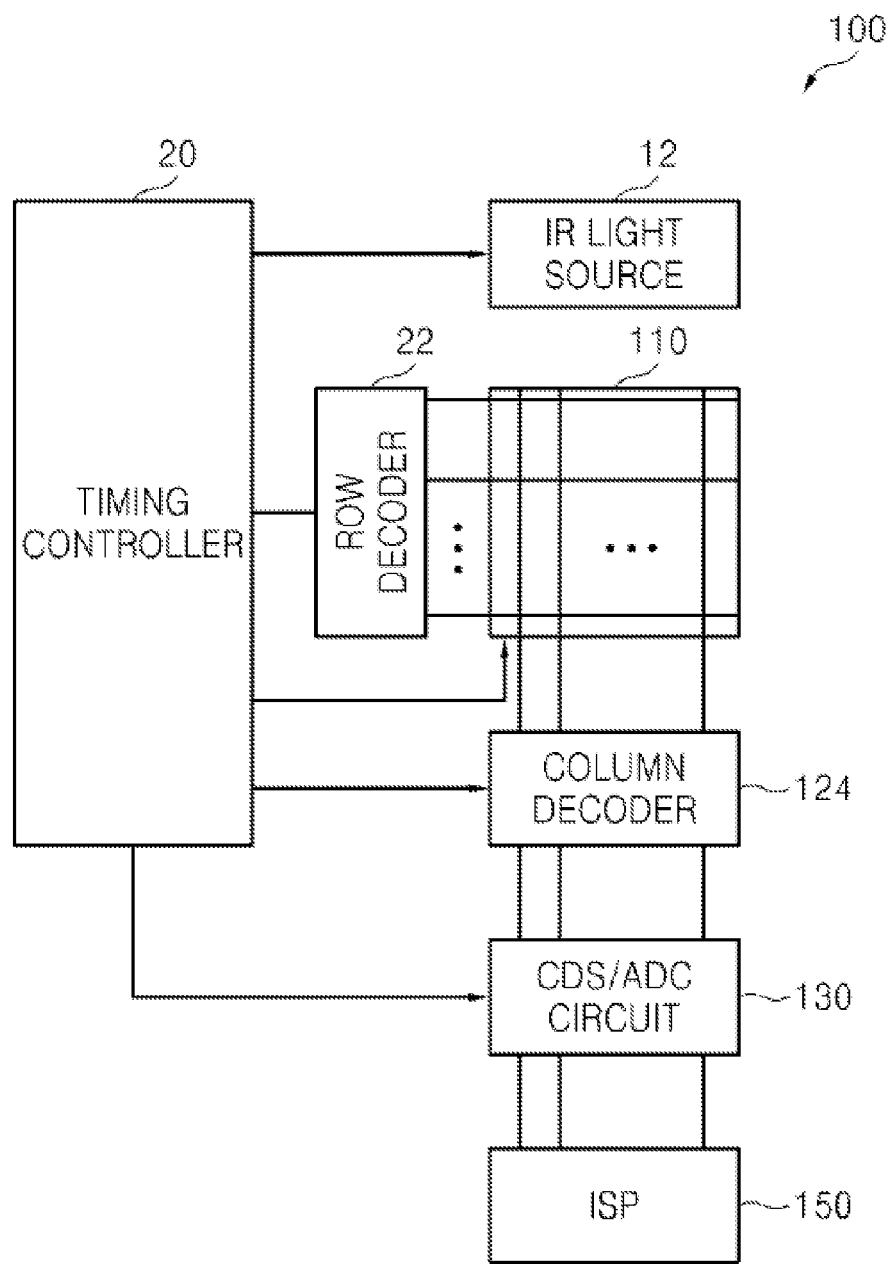
FIG. 6 is a block diagram of an image sensor including a depth pixel according to an exemplary embodiment.

FIG. 6 is a block diagram of an image sensor 100 including a depth pixel according to another exemplary embodiment. The image sensor 100 combines a function of measuring distance information using the depth pixel with a function of measuring color information (e.g., red color information, green color information, and blue color information) using color pixels (e.g., a red pixel, a green pixel, and a blue pixel), thereby obtaining both the distance information and the color information.

The image sensor 100 includes the infrared light source 12, the timing controller 20, a pixel array 110, the row decoder 22, a column decoder 124, a CDS/ADC circuit 130, and the ISP 150. Alternatively, the column decoder 124 may be disposed between the CDS/ADC circuit 130 and the ISP 150.

The infrared light source 12 may generate a modulated infrared photon signal under the control of the timing controller 20. Referring to FIGS. 2C and 6, in response to the control signal output from the timing controller 20, the infrared light source 12 may be enabled during the first interval T1 of each of the packets P through NP and may be disabled during the second interval T2 of each of the packets P through NP.

The pixel array 110 includes a plurality of pixels. Each of the pixels may be include a depth pixel, a red pixel, a green pixel, a blue pixel, a magenta pixel, a cyan pixel, and/or a yellow pixel. The structure and the operation of the depth pixel included in the pixel array 110 are substantially the same as those of the depth pixel described with reference to FIGS. 2A, 2C, and 3, and thus repetitive description of the depth sensor has been omitted.

The pixel array 110 may include a plurality of rows and a plurality of columns, wherein a plurality of pixels may be arranged in each of the rows. The row decoder 22 may select one row from the plurality of rows included in the pixel array 110 in response to control signals output from the timing controller 20. The column decoder 124 may select at least one column line from the plurality of column lines included in the pixel array 110 in response to control signals output from the timing controller 20. Among the plurality of pixels included in the pixel array 110, a pixel may be selected by the row decoder 22 and the column decoder 124. A signal (e.g., distance information or color information) generated by the selected pixel may be transmitted to the CDS/ADC circuit 130.

The CDS/ADC circuit 130 may converts a signal (e.g., distance information or color information) output from the pixel array 110 or the column decoder 124 into a digital signal. For instance, the CDS/ADC circuit 130 may perform CDS on a signal (e.g., distance information or color information) output from the pixel array 110 to generate a CDS signal and may perform ADC on the CDS signal to generate a digital signal.

The ISP 150 may detect a digital pixel signal (e.g., distance information or color information) from a digital signal output from the CDS/ADC circuit 130 or the column decoder 124.

The pixel array 110 may include a red pixel, a green pixel, a blue pixel, and a depth pixel capable of detecting wavelengths in the infrared range. The depth pixel may have a 2- or 1-tap pixel architecture, i.e., each depth pixel may include, for example, one storage site or two storage sites for respectively storing one sample signal or two sample signals.

The red pixel generates a red pixel signal corresponding to wavelengths in the red range of the visible spectrum. The green pixel generates a green pixel signal corresponding to wavelengths in the green range of the visible spectrum. The blue pixel generates a blue pixel signal corresponding to wavelengths in the blue range of the visible spectrum. The depth pixel may generate a depth pixel signal corresponding to wavelengths in the infrared range.

Figure 7:
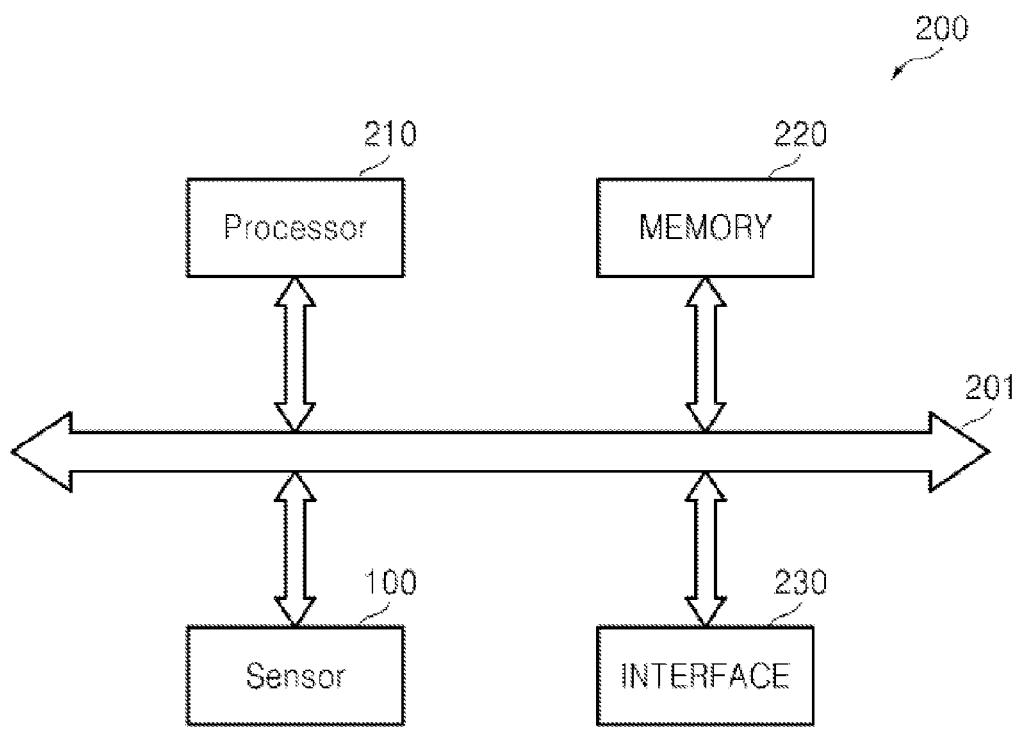
FIG. 7 is a block diagram of a data processing system including the image sensor illustrated in FIG. 6.

FIG. 7 is a block diagram of a data processing system 200 including the image sensor 100 illustrated in FIG. 6. Referring to FIG. 7, the data (or image) processing system 200 may include the image sensor 100 and a processor 210.

The processor 210 may control the operation of the image sensor 100, and more specifically, of the timing controller 20 as shown in FIG. 6. The processor 210 may store a program for controlling the operation of the image sensor 100. The processor 210 may access a memory (not shown) in which the program for controlling the operations of the image sensor 100 is stored and execute the program stored in the memory.

The image sensor 100 is controlled by the processor 210 to generate three-dimensional (3D) image information based on a digital pixel signal (e.g., color information or distance information). The 3D image information may be displayed by a display unit (not shown) connected to an interface 230, shown in FIG. 7.

Image information generated by the image sensor 100 may be stored in a memory device 220 via a bus 201 in compliance with the processor 210. The memory device 220 may be implemented by a non-volatile memory device. The interface 230 may be implemented by an interface for input or output of image information. For example, the interface 230 may be implemented by an input device such as a keyboard, a mouse, or a touch pad or may be implemented by an output device such as a display device or a printer.

Figure 8:
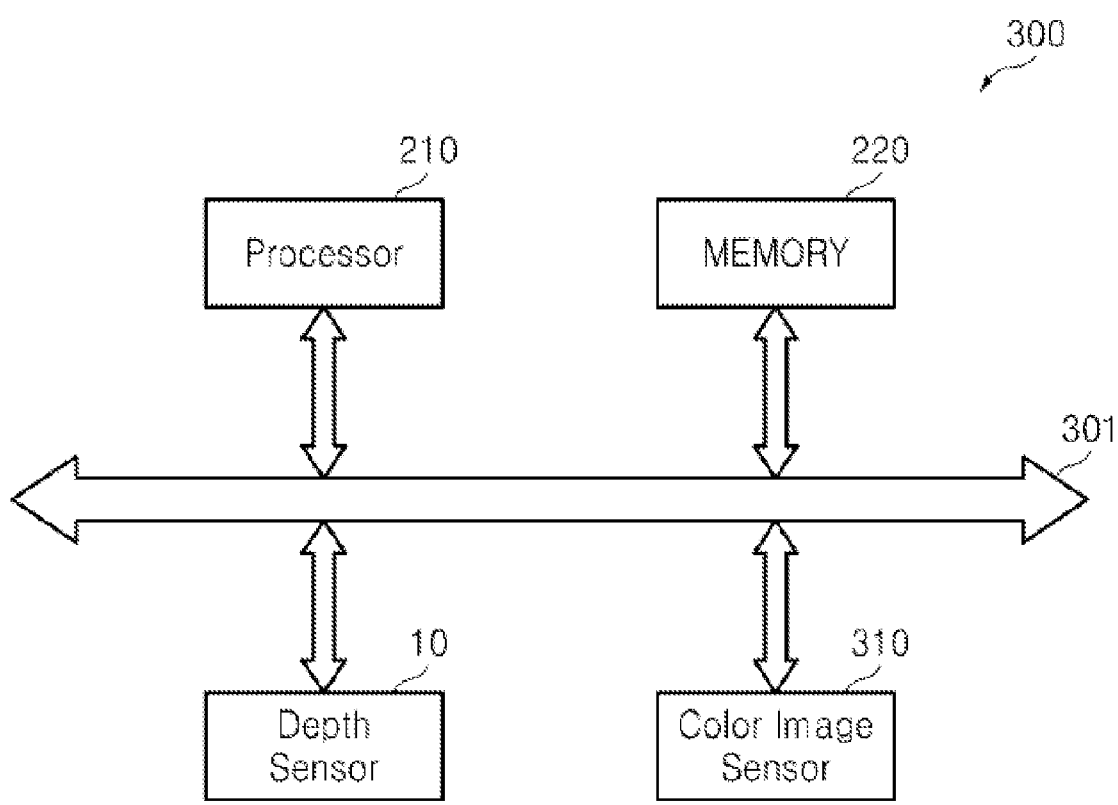
FIG. 8 is a block diagram of a data processing system including the sensor illustrated in FIG. 1 according to an exemplary embodiment.

FIG. 8 is a block diagram of a data processing system 300 including the sensor 10 illustrated in FIG. 1 according to another exemplary embodiment. Referring to FIG. 8, the data (or image) processing system 300 may include the depth sensor 10, a color image sensor 310 including a plurality of color pixels, and the processor 210. For clarity of the description, the depth sensor 10 and the color image sensor 310 are illustrated as being physically separated from each other, but they may share physical signal processing circuits with each other.

The color image sensor 310 may be an image sensor including a pixel array which includes only color pixels such as a red pixel, a green pixel, and a blue pixel without a depth pixel. At this time, the processor 210 may generate 3D image information based on distance information detected by the depth sensor 10 and color information (e.g., at least one item of information among red information, green information, blue information, magenta information, cyan information, and yellow information) detected by the color image sensor 310 and allow the 3D image information to be displayed by a display device (not shown). The 3D image information generated by the processor 210 may be stored in the memory device 220 via a bus 301.

The data processing system 200 or 300 illustrated in FIG. 7 or 8 may be used in 3D distance measurers, game controllers, depth cameras, and gesture sensing apparatuses.

Figure 9:
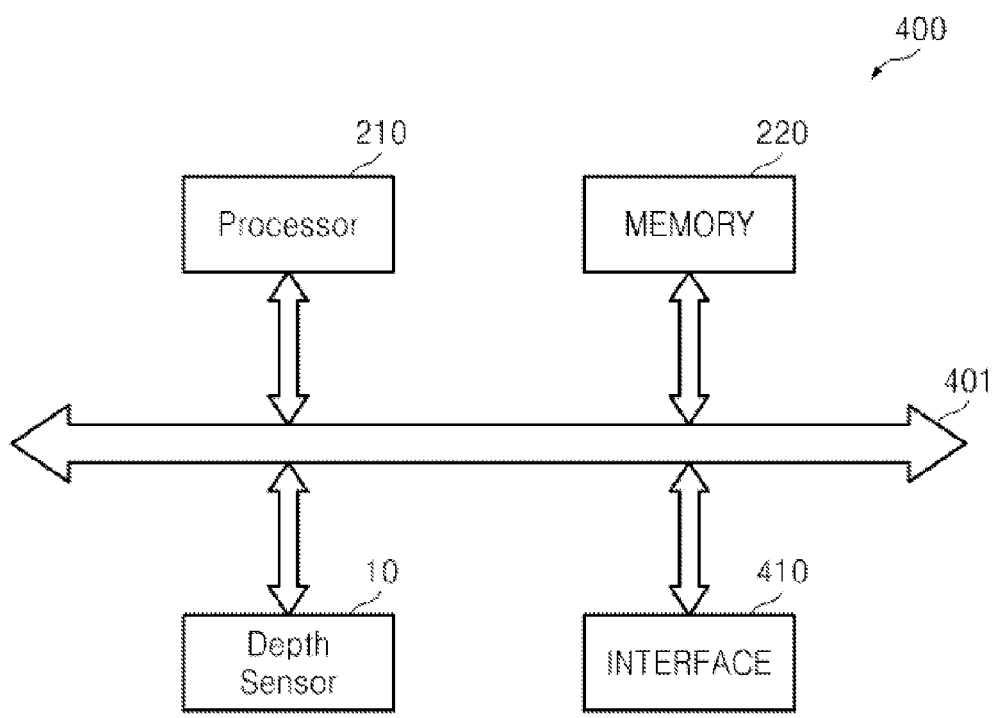
FIG. 9 is a block diagram of a data processing system including the sensor illustrated in FIG. 1 according to an exemplary embodiment.

FIG. 9 is a block diagram of a data processing system 400 including the sensor 10 illustrated in FIG. 1 according to another exemplary embodiment. Referring to FIG. 9, the data (image) processing system 400 functions only as a distance measuring sensor and includes the depth sensor 10 and the processor 210 controlling the operation of the of depth sensor 10.

The processor 210 may measure and/or calculate a distance between the data processing system 400 and an object (or a target) based on distance information detected by the depth sensor 10. The distance measured or calculated by the processor 210 may be stored in the memory device 220 via a bus 401. The interface 410 may be a display device, or alternatively may be an input device or output device.

As described above, according to exemplary embodiments, a sensor compensates for the loss in photoelectron transfer speed that may occur due to thermal diffusion, thereby quickly transferring photoelectrons to a floating diffusion region during a demodulation period. As a result, demodulation efficiency is increased.

Exemplary embodiments having thus been described, it will be obvious that the same may be varied in many ways. Such variations are not to be regarded as a departure from the intended spirit and scope of exemplary embodiments, and all such modifications as would be obvious to one skilled in the art are intended to be included within the scope of the following claims.

What is claimed is:

1. A method of operating a sensor, the method comprising:
   providing a plurality of packets, each packet including a first interval and a second interval, to demodulate a modulated photon signal output from a light source;
   providing a plurality of oscillation signals respectively having phases which are different from one another to a plurality of photogates, respectively, during the first interval of each of the plurality of packets; and
   disabling the light source and providing a direct current (DC) voltage to the plurality of photogates during the second interval of each of the plurality of packets,
   wherein the plurality of photogates collect and transfer generated photoelectrons to floating diffusion regions during the first interval and transfer residual photoelectrons which are not transferred during the first interval to floating diffusion regions during the second interval.

2. The method of claim 1, wherein a phase difference between the plurality of oscillation signals is 180 degrees and a phase difference between the modulated photon signal and at least one of the plurality of oscillation signal is 0, 90, 180, or 270 degrees.

3. The method of claim 1, wherein the DC voltage is a ground voltage.

4. The method of claim 1, wherein when each of the plurality of oscillation signals oscillates between a first level and a second level, the DC voltage is higher than or equal to the first level and lower than the second level.

5. The method of claim 4, wherein:
   a first depletion layer is formed in a semiconductor substrate under each of the plurality of photogates when the plurality of oscillation signals are provided respectively to the plurality of photogates at the first level;
   a second depletion layer is formed in the semiconductor substrate under each of the plurality of photogates when the plurality of oscillation signals are provided respectively to the plurality of photogates at the second level; and
   the second depletion layer is larger than the first depletion layer.

6. The method of claim 1, further comprising applying a turn-on voltage to a plurality of transfer gates, which transfer photocharges generated under the plurality of photogates respectively to a plurality of floating diffusion node, during the first interval and the second interval.

7. A method of operating a sensor, the method comprising:
   outputting a modulated photon signal from a light source;
   providing a plurality of packets, each packet comprising a first interval and a second interval;
   providing an oscillation signal to a photogate to demodulate the modulated photon signal during the first interval of each of the plurality of packets;
   generating photocharges under a photogate;
   transferring the photocharges generated under the photogate to a floating diffusion node using the oscillation signal; and disabling the light source and transferring residual photocharges among the generated photocharges to the floating diffusion node by applying a direct current (DC) voltage to the photogate during the second interval of each of the plurality of packets, wherein the photogate collects and transfers photocharges to the floating diffusion node during the first interval and transfers residual photocharges which are not transferred during the first interval to the floating diffusion node during the second interval.

8. The method of claim 7, wherein the DC voltage is a ground voltage.

9. The method of claim 7, wherein when the oscillation signal oscillates between a first level and a second level, the DC voltage is higher than or equal to the first level and lower than the second level.

10. The method of claim 9, wherein:
a first depletion layer is formed in a semiconductor substrate under the photogate when the oscillation signal is provided to the photogate at the first level;
a second depletion layer is formed in the semiconductor substrate under the photogate when the oscillation signal is provided respectively to the photogate at the second level; and
the second depletion layer is larger than the first depletion layer.

11. A sensor comprising:
a light source configured to generate a modulated photon signal;
a plurality of sensing circuits comprising a plurality of photogates; and
a controller configured to control the light source and the plurality of sensing circuits,
wherein the controller enables the light source and provides a plurality of oscillation signals respectively having phases which are different from one another to the plurality of photogates respectively during a first interval of each of a plurality of packets, each of the packets including the first interval and a second interval to demodulate the modulated photon signal output from the light source, and the controller disables the light source and provides a direct current (DC) voltage to the plurality of sensing circuits during the second interval of each of the plurality of packets,
wherein the controller controls the plurality of photogates collect and transfer generated photoelectrons to floating diffusion regions during the first interval and transfer residual photoelectrons which are not transferred during the first interval to floating diffusion regions during the second interval.

12. The sensor of claim 11, wherein the controller generates the plurality of oscillation signals having a 180-degree phase difference from each other.

13. The sensor of claim 11, wherein when each of the plurality of oscillation signals oscillates between a first level and a second level, the DC voltage is higher than or equal to the first level and lower than the second level.

14. The sensor of claim 13, wherein:
a first depletion layer is formed in a semiconductor substrate under each of the photogates respectively when the oscillation signals are respectively provided to the photogates at the first level;
a second depletion layer is formed in the semiconductor substrate under each of the photogates respectively when the plurality of oscillation signals are respectively provided to the photogates at the second level; and
the second depletion layer is larger than the first depletion layer.

15. The sensor of claim 11, wherein each of the plurality of sensing circuits comprises:
a floating diffusion region formed in a semiconductor substrate; and
a transfer gate configured to transfer photocharges generated in the semiconductor substrate under the photogate to the floating diffusion region,
wherein the transfer gate turns on during the first interval and the second interval.

16. A data processing system comprising:
the sensor of claim 11; and
a processor configured to control the controller comprised in the sensor.

17. The data processing system of claim 16, wherein the controller generates the plurality of oscillation signals having a 180-degree phase difference from each other.

18. The data processing system of claim 17, wherein:
the controller generates the plurality of oscillation signals which oscillate between a first level and a second level;
the DC voltage is higher than or equal to the first level and lower than the second level;
a first depletion layer is formed in a semiconductor substrate under each of the photogates respectively when the oscillation signals are respectively provided to the photogates at the first level;
a second depletion layer is formed in the semiconductor substrate under each of the photogates respectively when the plurality of oscillation signals are respectively provided to the photogates at the second level; and
the second depletion layer is larger than the first depletion layer.

19. The data processing system of claim 16, wherein each of the plurality of sensing circuits comprises:
a floating diffusion region formed in a semiconductor substrate; and
a transfer gate configured to transfer photocharges generated in the semiconductor substrate under the respective photogate to the floating diffusion region,
wherein the transfer gate turns on during the first interval and the second interval.

20. The data processing system of claim 16, wherein the data processing system is one selected from the group consisting of a three-dimensional distance measurer, a game controller, a depth camera, and a gesture sensing apparatus.

* * * * *